United States Patent [19]

Popov et al.

[11] Patent Number: 4,695,754
[45] Date of Patent: Sep. 22, 1987

[54] PERMANENT MAGNET ROTOR FOR AN ELECTRICAL MACHINE

[75] Inventors: Entcho N. Popov; Krestyo A. Stanilov; Rumen K. Apostolov; Pantcho G. Dundarov, all of Sofia; Peyu V. Radkov; Pentcho K. Aderski, both of Troyan; Georgi A. Georgiev, Sofia, all of Bulgaria

[73] Assignee: DSO "Elprom", Sofia, Bulgaria

[21] Appl. No.: 738,594

[22] Filed: May 28, 1985

[51] Int. Cl.⁴ .................... H02K 1/22; H02K 15/02
[52] U.S. Cl. ..................................... 310/156; 310/65; 310/217; 310/261
[58] Field of Search ............. 310/42, 65, 216, 217, 310/218, 156, 261, 61; 319/152, 254

[56] References Cited

U.S. PATENT DOCUMENTS

| 635,739 | 10/1899 | Bergmann | 310/65 |
| 642,599 | 2/1900 | Geisenhöner | 310/65 |
| 831,625 | 9/1906 | McElroy | 310/65 |
| 3,123,747 | 3/1964 | Glass | 310/65 |
| 4,510,680 | 4/1985 | Miller et al. | 310/156 |

Primary Examiner—Patrick R. Salce
Assistant Examiner—D. L. Rebsch

[57] ABSTRACT

A rotor of an electrical machine comprising pole pieces representing laminated packs of flux-conducting lamellae, and permanent magnets directly contacting the pole terminals, gaps being provided between the flux-conducting lamellae. The gaps are provided by projections on the lamellae themselves. The magnetic flux created by the permanent magnets is conducted through the pole pieces which are usually magnetically unsaturated. Since the latter consists of flux-conducting lamellae between which gaps are provided, the weight and inertia moment of the rotor are reduced without reducing the magnitude of the magnetic flux in the machine.

1 Claim, 2 Drawing Figures

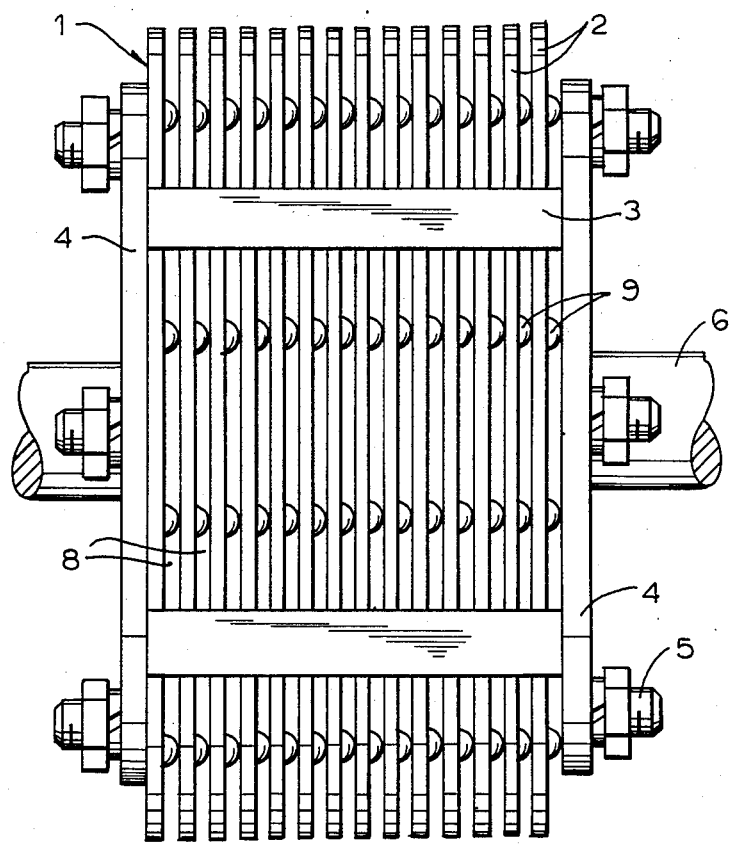
F I G. 1

F I G. 2
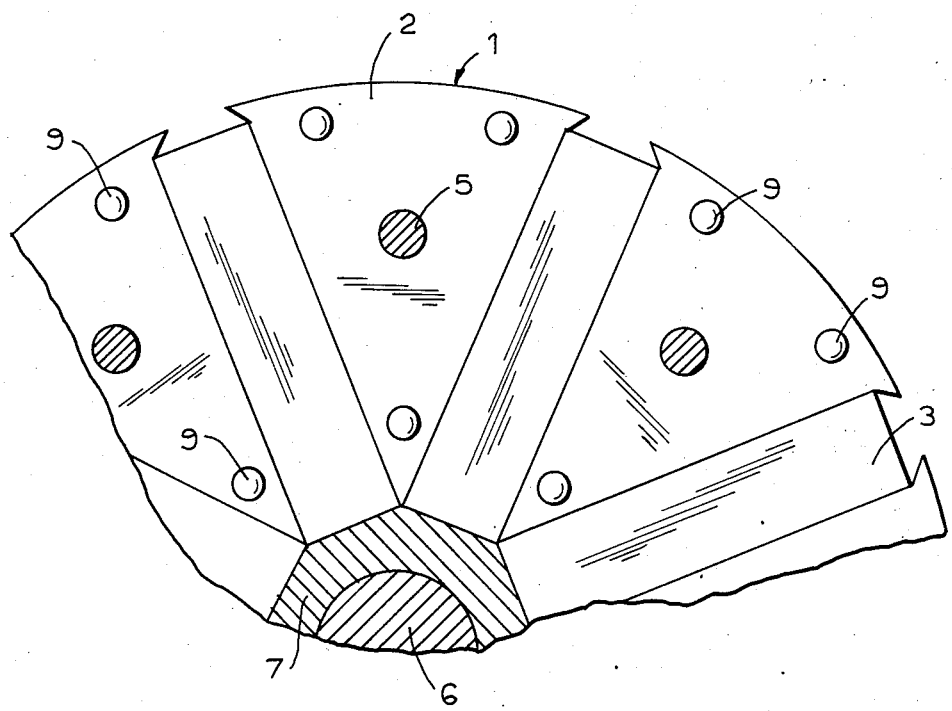

& # 3 4 ; 4,695,754

PERMANENT MAGNET ROTOR FOR AN ELECTRICAL MACHINE

BACKGROUND OF THE INVENTION

The invention relates to an inductor of an electrical machine which finds application in the manufacturing of electrical machines. The term "inductor" means any voltage inducing structure, such as a rotor or the stator of a rotary electrical machine.

It is known to provide a rotating inductor (rotor) of an electrical machine comprising a shaft on which pole pieces are fixed, to which pieces permanent ceramic magnets are attached with the magnetic axes tangentially directed to the axis of rotation. The pole pieces represent laminated packs of flux-conducting lamellae tightly pressed against each another.

It is also known to provide a rotating inductor of an electrical machine with permanent magnets which are used because of their high energy performance characteristics.

The disadvantages of the known constructions of rotating inductors lie in the comparatively heavy weight and high inertia moment despite the use of different types of permanent magnets (ceramic magnets, high energy magnets, etc.).

It is also known to provide a static inductor (stator) of an electrical machine, consisting of a body, pole pieces and permanent magnets contacting the latter. The pole pieces represent laminated packs of flux conducting lamellae tightly pressed against each another. The disadvantage of this construction is the comparatively heavy weight of the inductor regardless of the type of permanent magnet used.

SUMMARY OF THE INVENTION

The aim of the present invention is to provide an inductor of an electrical machine with a reduced weight, and in the case of a rotating inductor, of a lower inertia moment.

This aim is achieved with an inductor of an electrical machine comprising pole pieces representing laminated packs of magnet-conducting lamellae and permanent magnets directly pressed to the pole terminals. The laminated packs are designed in such a way as to provide gaps between the flux-conducting lamellae.

A preferred embodiment of the inductor, according to the invention, is where the gaps between the lamellae are provided by means of projections on the lamellae themselves.

An advantage of the invention is the ability to manufacture inductors of electrical machines with a reduced weight, regardless of the type of permanent magnets used. In the case of a rotating inductor, it is possible to reduce its inertia moment.

BRIEF DESCRIPTION OF THE DRAWINGS

With these and other objects in view, which will become apparent in the following detailed description, the present invention, which is shown by example only, will be clearly understood in connection with the accompanying drawing, in which:

FIG. 1 is a top plan view of a rotating inductor, and

FIG. 2 is a cross-section of the rotating inductor of FIG. 1.

DETAILED DESCRIPTION OF THE DRAWINGS

Referring to FIGS. 1 and 2, the pole pieces 1 represent laminated packs of magnet-conducting lamellae 2. The permanent magnets 3 are directly attached to the pole pieces 1. The pole pieces 1 and the permanent magnets 3 are covered by the non-magnetic discs 4, clamped in a pack with studs 5. The non-magnetic discs 4 are statically fixed to the shaft 6. The space between the pole pieces 1, the permanent magnets 3, and the shaft 6 is filled with non-magnetic material. Between the flux-conducting lamellae 2, gaps 8 are provided by means of projections 9 on the lamellae themselves. The projections 9 may be formed in a conventional manner and even if the formation of the projections results in a corresponding recess on the opposite side of the lamellae 2, it is clear that the projections 9 will still cause gaps 8 between the stacked lamellae 2. This is apparent, since any recess left on the opposite side of a lamella by the formation of a projection would be smaller than the projection by an amount corresponding to the thickness of the lamellae. Moreover, it is not necessary to provide mating recesses and protrusions for alignment purposes since alignment is secured by the studs 5 which pass through the lamellae as shown in FIG. 2. The lamellae 2 cannot rotate around the studs since they are packed as pole pieces 1 between adjacent permanent magnets 3.

The inductor according to the invention operates as follows:

The magnetic flux created by the permanent magnets 3 is conducted through the pole terminals 1 which are usually magnetically unsaturated. Since the latter consists of flux-conducting lamellae 2 between which gaps 8 are provided, the weight and the inertia moment of the inductor are reduced without causing a reduction of the magnetic flux in the machine.

When the invention is applied in a static inductor, its weight is similarly reduced.

We claim:

1. An inductor of a rotary electrical machine comprising a plurality of pole pieces, each pole piece representing a laminated pack of flux-conducting lamellae, and a plurality of permanent magnets, each magnet directly contacting a pole piece, gaps being provided between each of the flux-conducting lamellae: the pole pieces and the permanent magnets being covered by non-magnetic discs arranged parallel to said lamellae and clamped in a pack by studs, said non-magnetic disks being statically fixed to a shaft.

* * * * *